(12) United States Patent
Huang et al.

(10) Patent No.: US 10,162,547 B1
(45) Date of Patent: Dec. 25, 2018

(54) MEMORY EXPANSION IN A LINKING PROCESS

(71) Applicant: MARVELL INTERNATIONAL LTD., Hamilton (BM)

(72) Inventors: Haitao Huang, Shanghai (CN); Liping Gao, Shanghai (CN); Xinyu Qi, Shanghai (CN); Pengfei Li, Shanghai (CN)

(73) Assignee: MARVELL INTERNATIONAL LTD., Hamilton (BM)

(*) Notice: Subject to any disclaimer, the term of this patent is extended or adjusted under 35 U.S.C. 154(b) by 87 days.

(21) Appl. No.: 15/265,541

(22) Filed: Sep. 14, 2016

Related U.S. Application Data

(60) Provisional application No. 62/219,347, filed on Sep. 16, 2015.

(51) Int. Cl.
*G06F 3/06* (2006.01)

(52) U.S. Cl.
CPC .......... *G06F 3/0631* (2013.01); *G06F 3/0619* (2013.01); *G06F 3/0643* (2013.01); *G06F 3/0673* (2013.01)

(58) Field of Classification Search
CPC .... G06F 3/0619; G06F 3/0631; G06F 3/0643; G06F 3/0673
See application file for complete search history.

(56) References Cited

U.S. PATENT DOCUMENTS

| | | | |
|---|---|---|---|
| 2007/0220504 A1* | 9/2007 | Eker | G06F 8/665 717/168 |
| 2013/0297905 A1* | 11/2013 | Yang | G06F 12/02 711/165 |
| 2014/0143516 A1* | 5/2014 | Dawson | G06F 12/0253 711/171 |

* cited by examiner

*Primary Examiner* — Aracelis Ruiz

(57) ABSTRACT

Aspects of the disclosure provide a method for linking input files during a linking process. The method includes receiving an input section that is to be mapped to a memory segment by a linker circuit, determining whether an out-of-memory (OOM) event occurs when an available memory space of the memory segment is unable to accommodate the input section, estimating a memory expansion size that would be required for the memory segment to be able to accommodate the input section when an OOM event occurs, and creating by the linker circuit a map file that includes the estimated memory expansion size of the memory segment.

14 Claims, 9 Drawing Sheets

```
1 segment("s1data")
2 char foo[ ] = {31, 32, 33, 34, 35 ,36, 37, 38};
3
4 segment("s1code")
5 int func1(int index)
6 {
7     return foo[index];
8 }
```

*FIG. 2*

```
 1 MEMORY
 2 {
 3     PROGRAM   { TYPE(PM RAM) START(0x18004000) END(0x18004FFF) WIDTH(8) }
 4     DATA1     { TYPE(DM RAM) START(0x18005000) END(0x18005FFF) WIDTH(8) }
 5     DATA2     { TYPE(DM RAM) START(0x18006000) END(0x18006FFF) WIDTH(8) }
 6 }
 7
 8 PROCESSOR p 0
 9 {
10     SECTIONS
11     {
12         PROGRAM
13         {
14             INPUT_SECTIONS ($OBJECTS(s1code) $OBJECTS (program) $LIBRARIES (program))
15         } >PROGRAM
16
17         os1
18         {
19             INPUT_SECTIONS ($OBJECTS(s1data))
20         } >DATA1
21
22         os2
23         {
24             INPUT_SECTIONS ($OBJECTS(data1))
25         } > DATA1
26
27         OS3
28         {
29             INPUT_SECTIONS ($LIBRARIES(data1))
30         } >DATA2
31     }
32 }
```

*FIG. 3*

```
1   MEMORY MAP OF LINK PROJECT "p0"
2   NAME      START ADDRESS  END ADDRESS   MEMORY -BYTES-USED  MEMORY -BYTES-UNUSED
3   PROGRAM   0x1800400      0x18004fff    0x24a                0xdb6
4   DATA1     0x1800500      0x18005fff    0x1000a              0x0
5   DATA2     0x1800600      0x18006fff    0xf00                0x100
6
7   THE FOLLOWING OUTPUT SECTIONS HAVE BEEN LOCATED IN THE FOLLOWING MEMORY 'DATA1'
8   OUTPUT SECTION   TYPE         START ADDRESS   SIZE IN BYTES   MAPPING TYPE    BASE RUNTIME
9   os1              SHT_PROGBITS 0x18005000      0xf00           STANDARD
10  os2              SHT_PROGBITS 0x18005f00      0x100           STANDARD
11
12  THE FOLLOWING OUTPUT SECTIONS HAVE BEEN LOCATED IN THE FOLLOWING MEMORY 'DATA2'
13  OUTPUT SECTION   TYPE         START ADDRESS   SIZE IN BYTES   MAPPING TYPE    BASE RUNTIME
14  os3              SHT_PROGBITS 0x18006000      0xf00           STANDARD
```

MEMORY EXPANSION IN A LINKING PROCESS

INCORPORATION BY REFERENCE

This present disclosure claims the benefit of U.S. Provisional Application No. 62/219,347, "Automatic Memory Expansion for Solving Out of Memory" filed on Sep. 16, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

During a software development process, a linker can be used to join input object files and library files to produce output executable files which can be loaded onto a target processor, such as a digital signal processor. The linking process can be directed by a linker description file (LDF) which specifies how input sections of input files are mapped to a target memory space of the target processor. When a memory segment of the target memory space cannot accommodate an input section as specified by the LDF during the linking process, an out-of-memory (OOM) event occurs. Accordingly, the linking process has to be terminated, and the LDF has to be modified before another linking process takes place.

SUMMARY

Aspects of the disclosure provide a method for linking input files. The method includes receiving an input section that is to be mapped to a memory segment by a linker circuit, determining whether an out-of-memory (OOM) event occurs when an available memory space of the memory segment is unable to accommodate the input section, estimating a memory expansion size that would be required for the memory segment to be able to accommodate the input section when an OOM event occurs, and creating by the linker circuit a map file that includes the estimated memory expansion size of the memory segment.

In one embodiment, the method further includes expanding the memory segment based on the estimated memory expansion size, and mapping the input section to an available memory space of the expanded memory segment.

In another embodiment, the method further includes repeating receiving an input section, determining whether an OOM occurs, and estimating a memory expansion size when an OOM event occurs for a plurality of input sections that are to be mapped to a plurality of memory segments by the linker circuit, and expanding the plurality of memory segments based on the estimated memory expansion sizes corresponding to respective input sections for which OOM events occur. In an example, the method further includes determining, for each of the plurality of input sections, whether an OOM event occurs with the respective expanded memory segment, and when no OOM event occurs for an input section with the respective expanded memory segment, mapping the input section to the respective expanded memory segment.

Embodiments of the method includes modifying, based on the created map file, a linker description file (LDF) for linking the input files, and performing a linking process for linking the input files based on the modified LDF. In one example, modifying an LDF for linking the input files includes moving an output section in the memory segment to another memory segment wherein the moved output section having a size larger than a difference between the size of the expanded memory and a size of an unused memory in the memory segment.

In one example, estimating a memory expansion size that would be required for the memory segment to be able to accommodate the input section includes determining a difference between a size of the input section and a size of an available memory space in the memory segment to be the memory expansion size that would be required for the memory segment to be able to accommodate the input section.

Aspects of the disclosure provide an apparatus for linking input files. The apparatus includes processing circuitry configured to receive an input section that is to be mapped to a memory segment, determine whether an OOM event occurs when an available memory space of the memory segment is unable to accommodate the input section, estimate a memory expansion size that would be required for the memory segment to be able to accommodate the input section when an OOM event occurs, and create a map file that includes the estimated memory expansion size of the memory segment.

Aspects of the disclosure provide a non-transitory computer readable medium storing program instructions for causing a processor to perform operations for linking input files. The operations includes receiving an input section that is to be mapped to a memory segment, determining whether an OOM event occurs when an available memory space of the memory segment is unable to accommodate the input section, estimating a memory expansion size that would be required for the memory segment to be able to accommodate the input section when an OOM event occurs, and creating a map file that includes the estimated memory expansion size of the memory segment.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows an example of source code written with C programming language according to an embodiment of the disclosure;

FIG. 3 shows an example of a linker description file (LDF) according to an embodiment of the disclosure;

FIG. 6 shows a map file generated from a linking process in which no OOM event occurs;

DETAILED DESCRIPTION OF EMBODIMENTS

Figure 1:
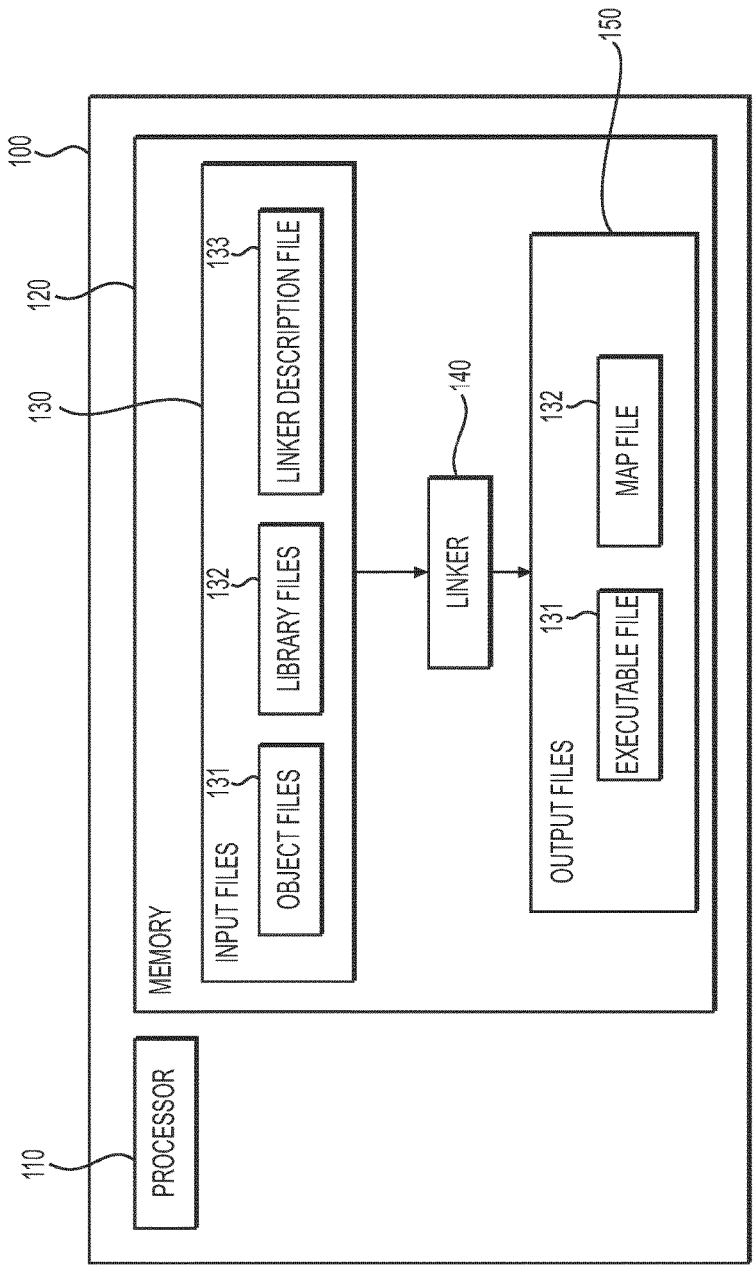
FIG. 1 shows a block diagram of a computer according to an embodiment of the disclosure.

FIG. 1 shows a block diagram of a computer 100 according to an embodiment of the disclosure. The computer 100 includes hardware components, such as a processor 110, a memory module 120, as well as software components, such as various code instructions stored in the memory module 120. In an example, the computer 100 is used by a software developer to develop programs for a digital signal processor.

In an embodiment, the memory module 120 includes a linker 140 implementing a memory expansion scheme. The linker 140 performs a linking process to take object and library files as input files and produce executable files. During the linking process, input sections of the input files are mapped to memory segments of a target memory space according to a linker description file (LDF). An out-of-memory (OOM) event can occur when a memory segment is unable to accommodate an input section of an input files as specified by the LDF.

According to an aspect of the disclosure, when an OOM occurs with an input section, the linker 140 can estimate a memory expansion size that would be required for the respective memory segment to be able to accommodate the input section, and expand the respective memory segment based on the estimated memory expansion size. Subsequently, the expanded memory segment is used to map the input section to the expanded memory segment. As a result, frequent interruptions to the linking process caused by OOM events are avoided, and memory expansion information is acquired at the end of the linking process. Based on the acquired memory expansion information, a developer can modify the LDF to adjust memory allocation arrangement for a next linking process.

The computer 100 can be a desktop computer, a laptop computer, a mobile phone, and the like in various embodiments. The computer 100 can include other suitable components (not shown), such as a display, a touchscreen, a microphone, a communication component, and the like. In various examples, the processor 110 includes one or more processing units to execute various code instructions to perform various tasks. In an example, the processor 110 is a multi-core processor, such as a dual-core processor, a quad-core processor, and the like. In addition, in various examples, the processor 110 can have any suitable architecture, such as an x86 architecture, a reduced instruction set computing (RISC) architecture, a complex instruction set computing (CISC) architecture, and the like.

The memory module 120 includes one or more storage media that provide memory spaces for various storage needs. In an example, the memory module 120 stores code instructions to be executed by the processor 110. In another example, the memory module 120 includes memory spaces allocated for system storage, and memory spaces allocated for user storage. The storage media include, but are not limited to, hard disk drive, optical disc, solid state drive, read-only memory (ROM), dynamic random access memory (DRAM), static random access memory (SRAM), flash memory, and the like.

In one example, the computer 100 is used by a software developer to perform a linking process. Accordingly, as shown in FIG. 1, in addition to the linker 140, a first memory space in the memory module 120 is allocated to store input files 130 of the linking process. The input files include object files 131, library files 132, and a LDF 133 in an example.

The object files 131 are generated from source files produced by one or more developers through compiling and/or assembling processes. A second memory space in the memory module 120 is allocated to store output files 150 of the linking process in an example. The output files 150 include an executable file 131 and a map file 132. In one example, the executable file 131 can be loaded to a memory of a target processor for execution at the target processor. The map file 132 includes memory allocation information reflecting memory usage of target memory space after the linking process.

FIG. 2 shows an example of source code 200 written with C programming language according to an embodiment of the disclosure. As shown, the source code 200 includes two input sections of two types. A first input section is specified by line 1 and named with "s1data". The first input section is a data section and a data array foo[ ] is defined in the data section. A second input section is specified by line 4 and named with "s1code". The second input section is a code section and a function "func1" is defined in the code section. The source code 200 can be converted to an object file through a compiling process and an assembling process, and the produced object file will include a first input section and a second input section corresponding to the first input section and the second input section specified in the source code 200.

FIG. 3 shows an example of an LDF 300 according to an embodiment of the disclosure. Generally, an LDF is composed by a software developer to direct a linking process and control placement of portions (referred to as output sections) of output executable files in a target memory space. An LDF specifies how input sections are grouped into output sections and mapped into the target memory space. Specifically, input sections of the same type are combined into one output section, and a plurality of input sections are organized into multiple output sections which are mapped to a plurality of memory segments.

In FIG. 3 example, lines 3-5 define a first, second and third memory segments, namely PROGRAM, DATA1, and DATA2, respectively. In addition, types, starting and ending addresses, memory widths of each memory segment are also specified.

Lines 12-15 specify a first output section named with "program" (line 12). The first output section is to be mapped to the first memory segment PROGRAM as specified by line 15. As specified in line 14, the first output section includes three input sections from the input files of the linking process: two input sections "s1code" and "program" from two object files, and one input section "program" from library files. The three input sections are of the same type (code sections).

Similarly, lines 17-20 and lines 22-25 specify a second and third output sections "os1" and "os2", respectively. Both the second and third output sections are to be mapped to the second memory segment DATA1 as specified by lines 20 and 25. In addition, the second output section includes one input section "s1data" (line 19) and the third output section includes another input section "data1". The input sections "s1data" and "data1" are from the two object files. Lines 27-30 specify a fourth output section "os3" which is mapped to the third memory segment DATA2. In addition, the fourth output section includes one input section "data1" from the library files.

Figure 4:
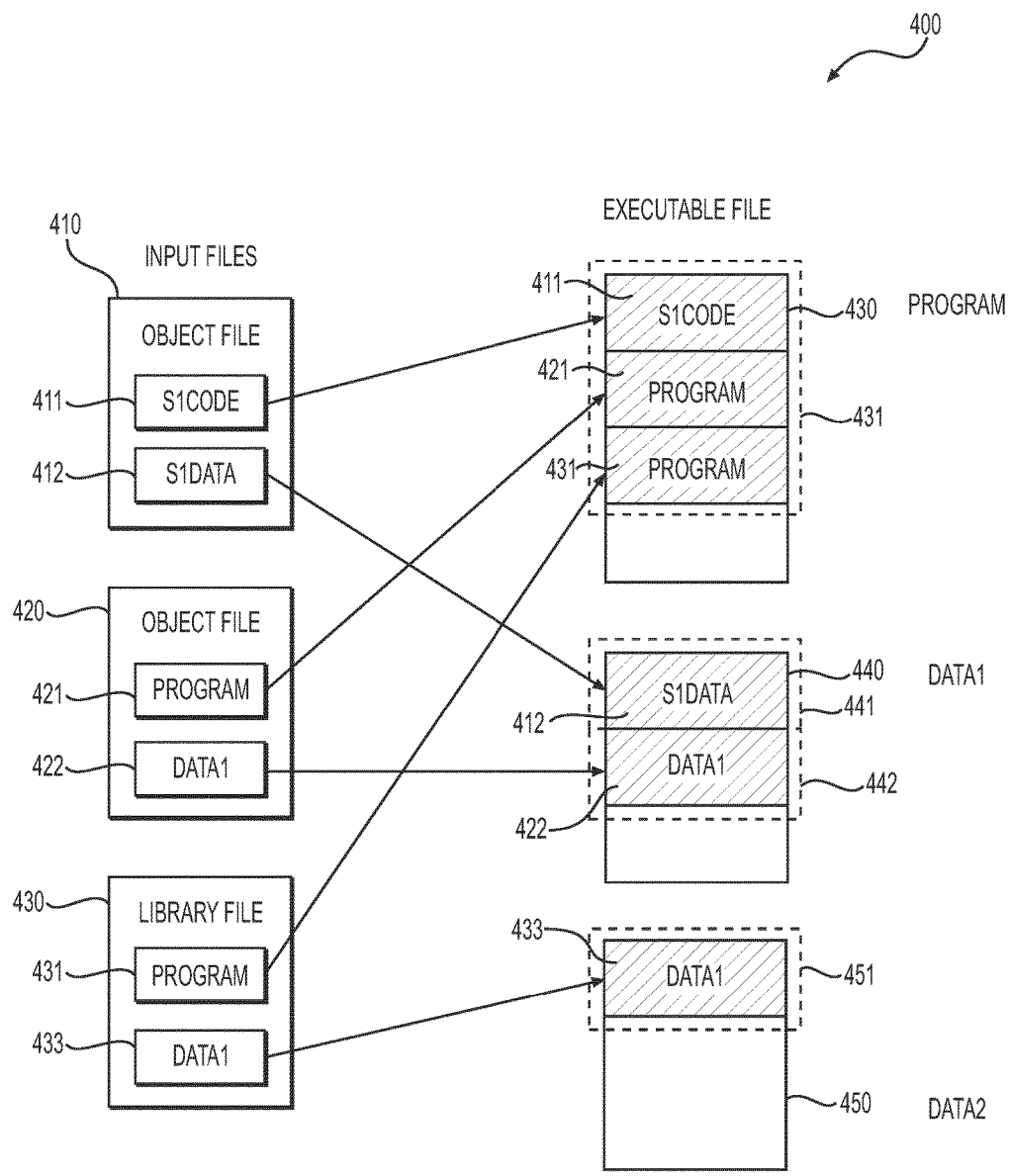
FIG. 4 illustrates mapping of input sections onto memory segments specified by the LDF in FIG. 3.

FIG. 4 illustrates mapping of the input sections onto the memory segments specified by the LDF 300 in FIG. 3. As shown, on the left side are the two input object files 410 and 420 and the input library file 430, while on the right side are the executable file which includes four output sections 431/441/442/451 mapped into the three memory segments 430/440/450. The object file 410 includes the input section "s1code" 411, and the input section "s1data" 412. The object file 420 includes the input section "program" 421 and the input section "data1" 422. The library file 430 includes the input section "program" 431 and the input section "data1" 433. As shown, the input sections 411/412/421/422/431/433 are combined into four output sections 431/441/442/451 which are arranged into three memory segments 430/440/450.

In one example, during the linking process, the linker 140 assigns available memory spaces to the input sections according to the direction of the LDF 300. Once the linker 140 completes the memory assignment for each input section, the linker subsequently substitutes the symbol references in each input section (such as function names or variable names) with memory addresses (this operation is referred to as symbol resolution). Thereafter, the linker 140 writes the modified code or data to the output executable file.

Figure 5:
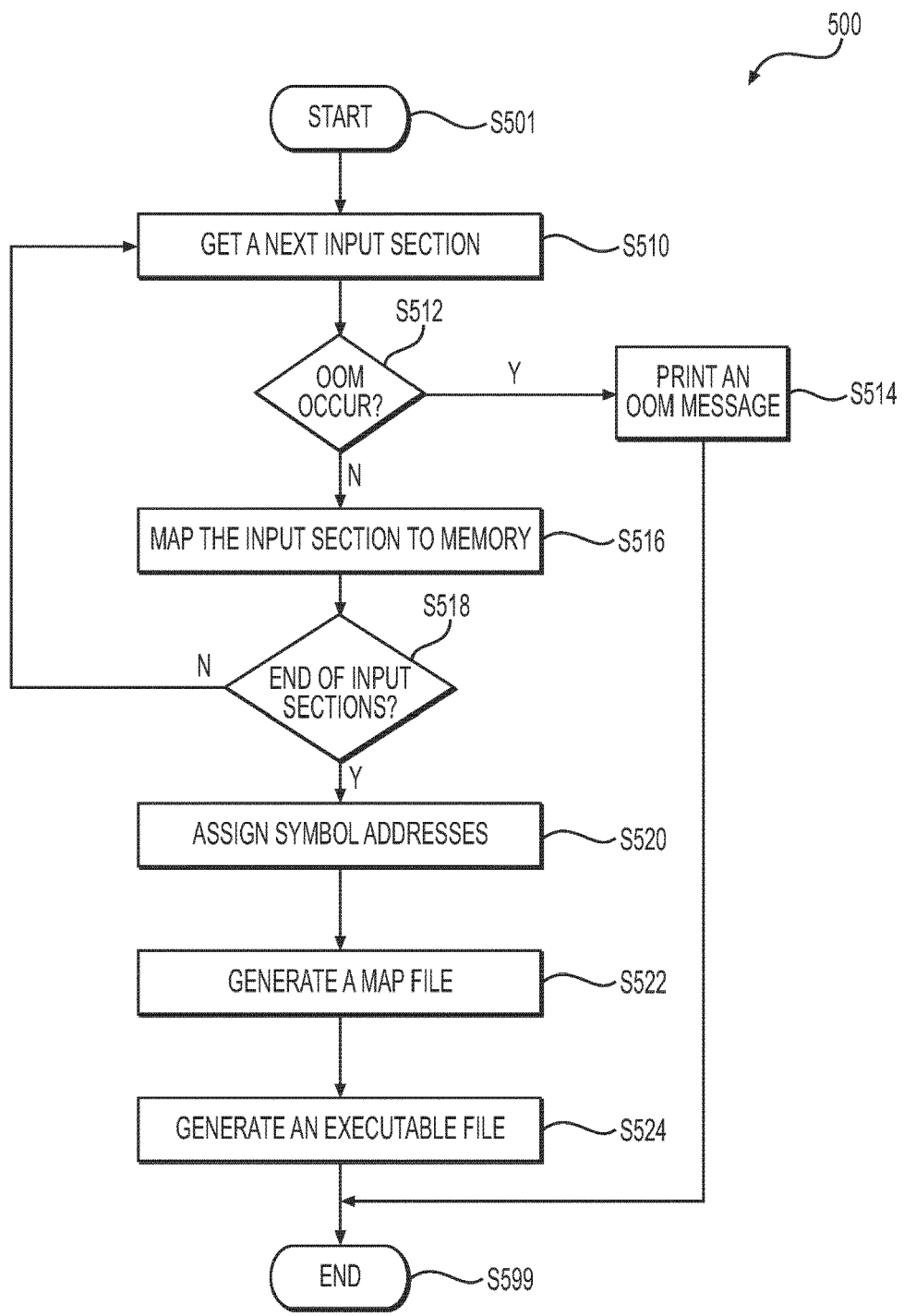
FIG. 5 shows a linking process performed by a linker.

FIG. 5 shows a linking process 500 performed by a linker. The linking process 500 does not implement the memory expansion scheme as implemented in the linker 140, thus will terminate when an OOM occurs. The linking process 500 starts at S501, and proceeds to S510.

At S510, size information of a next input section is retrieved.

At S512, whether available a memory space in a target memory segment (as specified by a LDF) is able to accommodate the input section is determined. When the available memory space is unable to accommodate the input section, an OOM event occurs, and the process 500 proceeds to S514. Otherwise, the process 500 proceeds to S516.

At S514, an OOM message indicating occurrence of the OOM event is printed. Then, the process proceeds to S599 and terminates at S599.

At S516, the input section is mapped to the target memory segment. Specifically, for example, the linker uses a data structure to record a memory area that has been assigned to the input section.

At S518, whether there are other input sections to be mapped to the target memory space is determined. When there are other input sections, the process 500 returns to S510. Otherwise, the process 500 proceeds to S520.

At S520, reference symbols in the input sections are assigned with memory addresses (symbol resolution) based on the memory assignment information determined at S516.

At S522, a map file is generated. The map file describes memory usage of the target memory as the result of the linking process 500.

At S524, an executable file is generated. Specifically, the code or data of the modified input sections is written into the executable file along with other information (e.g., a file header, a list of reference symbols, and the like). The process 500 proceeds to S599 and terminates at S599.

Generally, a linking process terminates when an OOM event occurs, and a developer has to modify the LDF for the linking process, for example, move an output section from one memory segment to another memory segment to solve the OOM issue. However, as described above, when the linking process terminates in the middle of the linking process, size information of the output section that includes the respective input section may not be available. In addition, size information of additional memory needed for accommodate the respective input section is also unavailable. As a result, operations of moving an output section lack support of accurate memory size information and are unfeasible. In addition, in some examples, an LDF may specify dozens of memory segments and hundreds of output sections including numerous input sections, and numbers of possible OOM events may be large. OOM events may frequently interrupt the linking process thus decreasing the efficiency of linking operations.

FIG. 6 shows a map file 600 generated from a linking process in which no OOM event occurs. The map file 600 may include other information that is not shown in FIG. 6. As shown, lines 3-5 describe memory usage of three memory segments PROGRAM, DATA1 and DATA 2. Specifically, information of starting address, ending address, used memory bytes and unused memory bytes is presented. Lines 7-14 describe size information (in the field of "size in bytes") of three output sections "os1", "os2", and "os3" in addition to other information.

Figure 7:
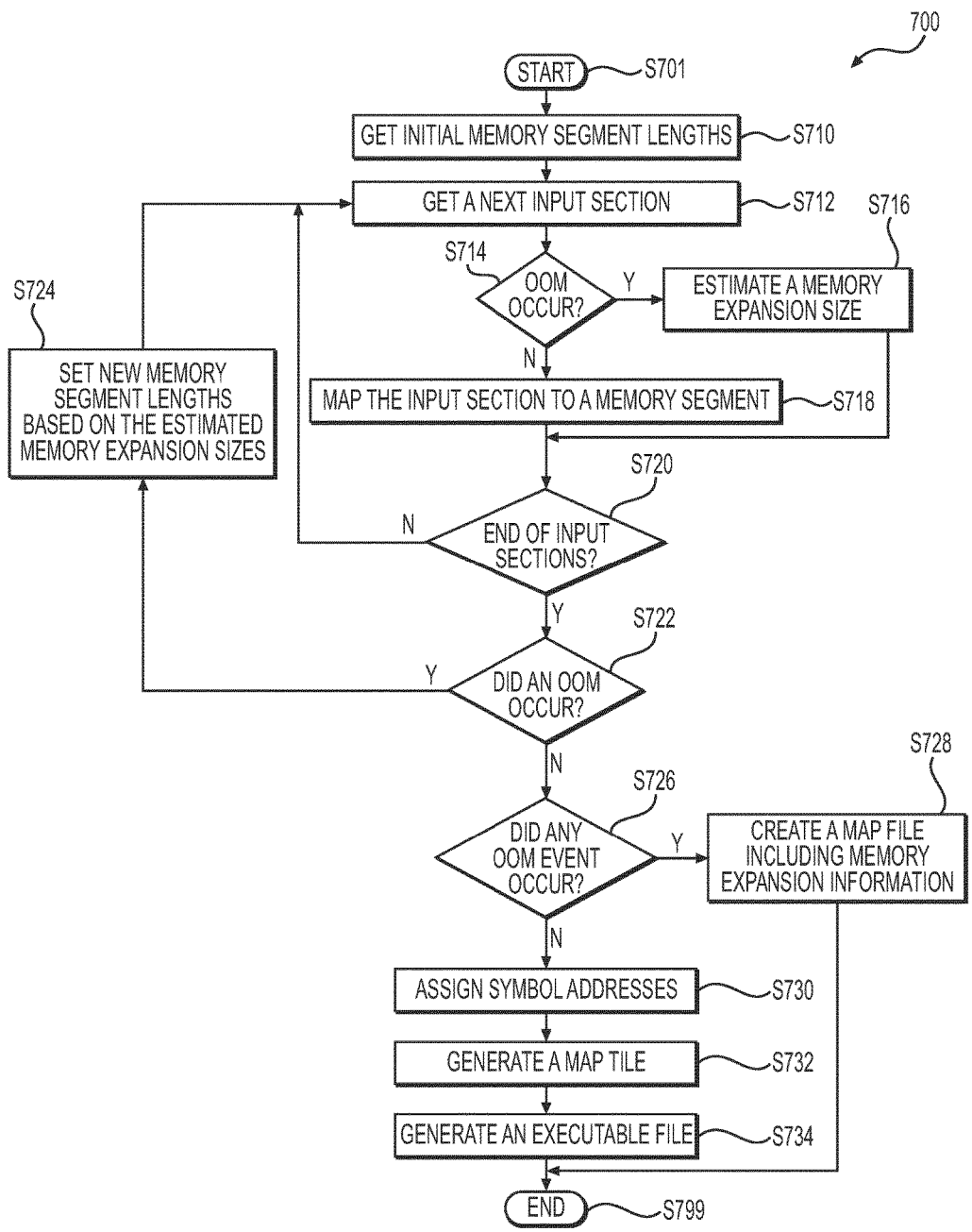
FIG. 7 shows a linking process according to an embodiment of the disclosure.

FIG. 7 shows a linking process 700 according to an embodiment of the disclosure. The linking process 700 implements the memory expansion scheme and maps input sections of input files to expanded memory segments once an OOM event occurs. The linking process 700 continues until all input sections are mapped even though one or more OOM events occur. At the end of the linking process 700 in which one or more OOM events occur, memory usage information including memory expansion sizes and output section sizes is obtained. The obtained memory allocation information can be used later for modification of an LDF. The linking process 700 can be performed by the linker 140 in FIG. 1 example, and the linker 140 is used as an example to explain the linking process 700. The linking process 700 starts at S701 and proceeds to S710.

At S710, initial lengths of memory segments are retrieved. For example, the linker 140 reads memory segment length information from an LDF.

At S712, size information of a next input section is retrieved. In one example, the linker 140 scans input files at the beginning of the linking process 700 to obtain size information of input sections. The obtained size information is used in later phases of the linking process 700.

At S714, it is determined whether, as specified by the LDF, an available memory space of a target memory segment is able to accommodate the input section whose size information is retrieved at S712. In one example, the linker 140 employs suitable data structure and algorithm to assign an available memory space of a memory segment to respective input sections, and record memory allocation information of each memory segment. The linker 140 checks the record to find an available memory space in the target memory segment for accommodating the input section. When no available memory space is large enough to accommodate the input section, an OOM event occurs, and the linking process 700 proceeds to S716. Otherwise, the linking process 700 proceeds to S718.

At S716, a memory expansion size of the target memory segment onto which the input section is being mapped is estimated by the linker 140. The estimated memory expansion size is a memory size that would be required for the target memory segment to be able to accommodate the input section. In one example, the linker 140 finds an available memory space in the target memory space, and the difference between the size of the available memory space and the size of the input section is determined to be the memory expansion size.

At S718, the input section is mapped to the target memory segment. Specifically, a memory area in the target memory segment is assigned to the input section, and the linker 140 records memory assignment information (e.g., size and starting address of assigned memory) using the data structure.

At S720, whether there are other input sections to be processed is determined. When there are other input sections to be processed, the process 700 returns to S712. Otherwise, the linking process 700 proceeds to S722.

From step S712 to S720, for each input section, whether an available memory space is able to accommodate the input section is determined. When OOM event occurs, a memory expansion size is estimated for the input section, while when there is enough memory space to accommodate the input section, the linker 140 maps the input section to a memory segment and records the memory allocation information.

At S722, whether an OOM event occurred at S714 is determined. When at least one OOM event occurs at S714, the linking process 700 proceeds to S724. Otherwise, the linking process 700 proceeds to S726.

At S724, new memory segment lengths are set based on the memory expansion sizes estimated at S716. For example, a memory expansion size is estimated for a target memory segment due to an OOM event at S716. Accordingly, the length of the target memory segment is expanded at S724 to be the sum of its previous length and the length of a memory having the memory expansion size. In another example, more than one memory expansion sizes corresponding to multiple input sections are estimated for a target memory segment, and the sum of the memory expansion sizes are used to expand the target memory segment to obtain a new length of the target memory segment.

After S724, the linking process 700 returns to S712, and the new lengths of the memory segments are used to perform another round of mapping operation through S712 to S720. The steps of S712 to S722 are iterated until no OOM event ever occurs.

It is noted that when setting new memory segment lengths at S724, an expanded portion of a memory segment may not be large enough to accommodate all the input sections incurring OOM events through steps S712 to S720. For example, during the linking process 700, a set of memory segment lengths (referred to as current memory segment lengths) are determined at S724. During iterations through S712 to S720, a first OOM event occurs at S714, and a first estimation of a first memory expansion size corresponding to a target memory segment is performed at S716 based on a current length of the target memory segment. Then, a second OOM event occurs, and a second estimation of a second memory expansion size needs to be performed at S716. At this moment, the second estimation of the second memory expansion size may be based on the same current length of the target memory segment without considering the effect of memory expansion caused by the first OOM event. As a result, the memory estimations at S716 may be inaccurate. Accordingly, new memory segment lengths determined based on the estimated memory expansion sizes at S716 may also be inaccurate.

However, due to the iteration of the linking process 700 through S712 to S722, input sections initially causing OOM events can be gradually mapped to the expanded target memory segments by repeating operations of steps S712 to S722 multiple times.

At S726, whether any OOM event ever occurred at S714 is determined. When an OOM event did ever occur, the linking process 700 proceeds to S728. Otherwise, the linking process 700 proceeds to S730.

At S728, a map file including memory expansion information is created by the linker 140. For example, one OOM event occurs for an input section at a memory segment during steps from S712 to S720, and a memory expansion size is estimated as S716. Accordingly, the memory segment is expanded at S724 with the memory expansion size to accommodate the input section. The memory size information (the estimated memory expansion size) of the expanded portion of the memory segment will be included in the map file. In other examples, memory sizes of multiple expanded portions of memory segments that have been expanded at S724 are included in the map file. After S728, the linking process 700 proceeds to S799 and terminates at S799.

At S730, code or data of the input sections are modified, and reference symbols in the input sections are assigned with memory addresses (symbol resolution) based on the memory assignment information determined at S718.

At S732, a map file is generated. The map file describes memory usage of the target memory segments as the result of the linking process 700 in which no OOM event occurs.

At S734, an executable file is generated. Specifically, the code or data of the modified input sections is written into the executable file along with other information (e.g., a file header, a list of reference symbols, and the like). The linking process 700 proceeds to S799 and terminates at S799.

Figure 8:
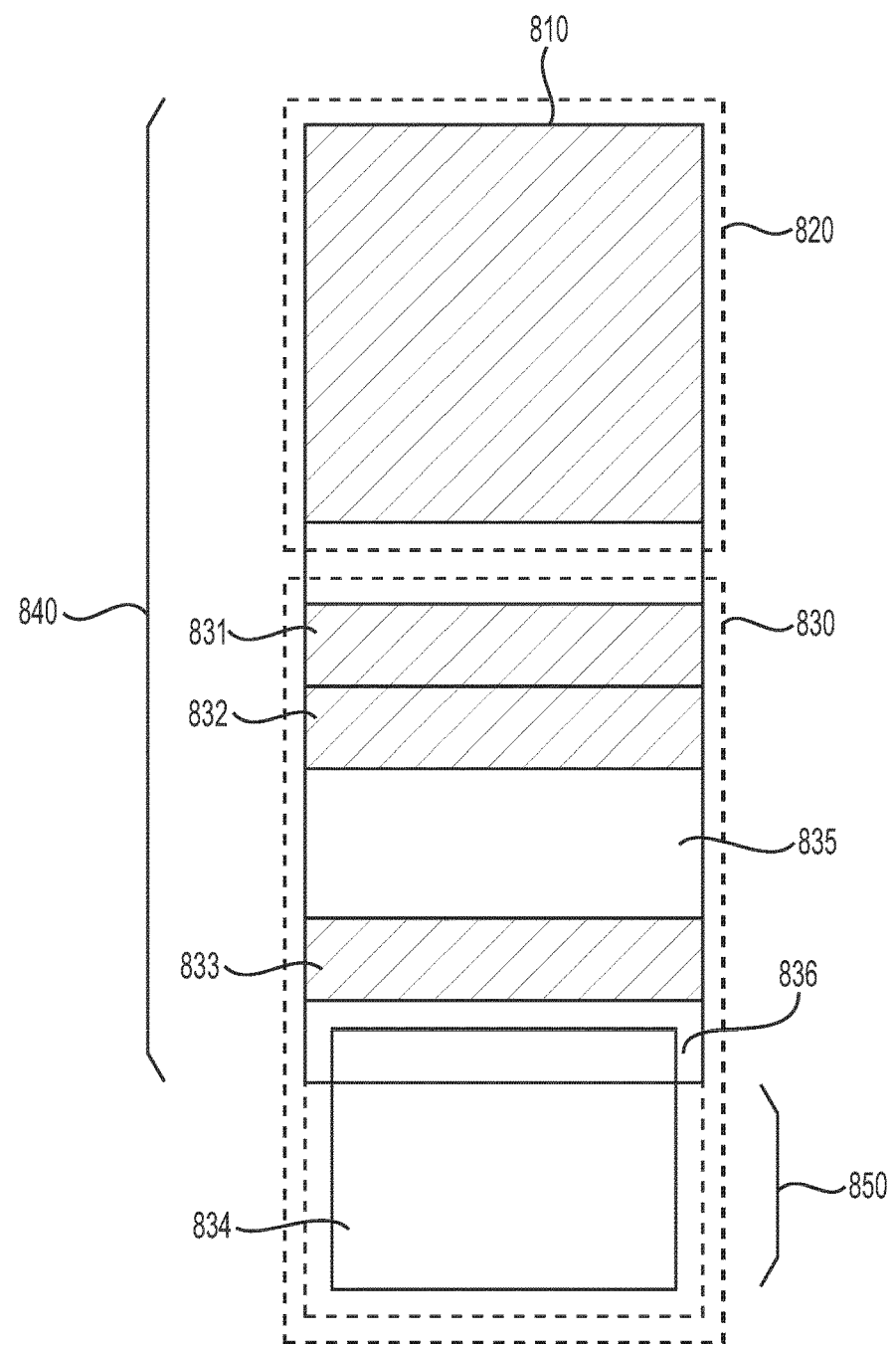
FIG. 8 shows an example of estimating a memory expansion size according to an embodiment of the disclosure.

FIG. 8 shows an example of estimating a memory expansion size 850 that would be required for a memory segment 810 to be able to accommodate an input section 834 during a linking process according to an embodiment of the disclosure. As shown in FIG. 8, the memory segment 810 has a memory size 840 and is allocated to store a first output section 820 and a second output section 830 according to an LDF. For the first output section 820, mapping of input sections included in the first output section 820 has been completed.

For the second output section, input sections 831-833 have been mapped to the memory segment by a linker. As shown in the example, the input sections 831 and 832 are mapped to two consecutive memory areas, while the input section 833, for example, as specified by the LDF, is mapped to a memory area which is not adjacent to the input sections 831 and 832. As a result there are two "holes" 835 and 836 existing at the memory segment 810. Now, the linker is to map an input section 834 of the output section 830 to the memory segment 810.

The linker may select the available memory space 836, and compare the size of the input section 834 and that of the available memory space 836 to determine whether the available memory space 836 is able to accommodate the input section 834. As in the example of FIG. 8, the available memory space 836 is large enough to accommodate the input section 834, and an OOM event occurs. The linker uses the difference 850 between the size of the input section 834 and that of the available memory space 836 as the estimated memory expansion size that would be required for the memory segment 810 to accommodate the input section 834.

Figure 9:
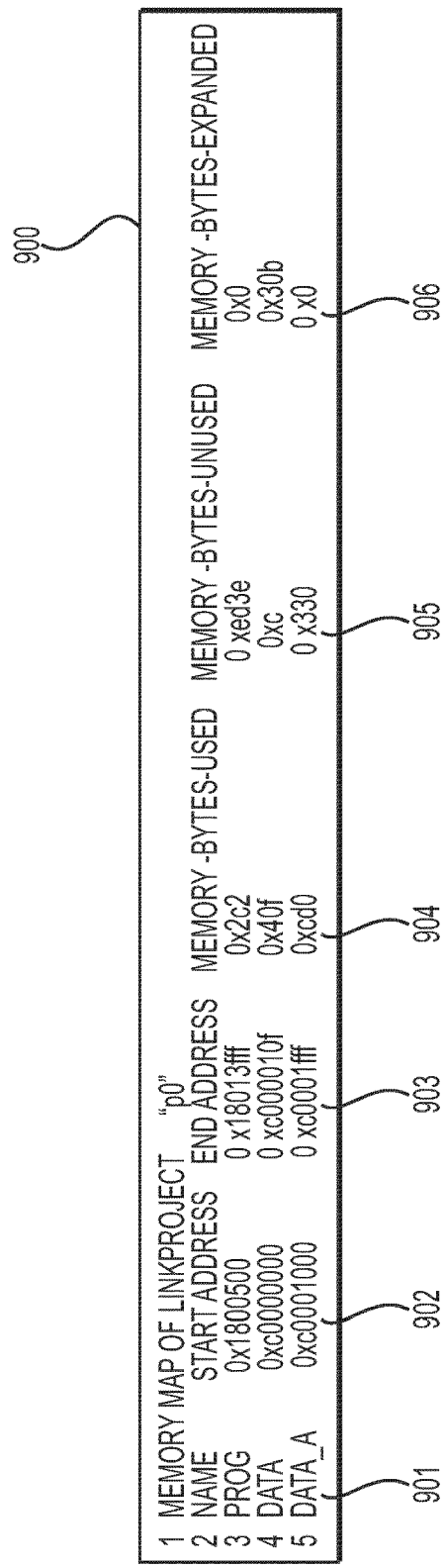
FIG. 9 shows a portion of a map file including memory expansion information according to an embodiment of the disclosure.

FIG. 9 shows a portion of a map file 900 including memory expansion information according to an embodiment of the disclosure. The map file 900 is generated from a linking process implementing the memory expansion scheme. One or more OOM events have occurred during the linking process, and a memory segment has been expanded to accommodate respective input sections.

Specifically, as shown in lines 3-5, three memory segments PROG, DATA, and DATA_A are presented in column 901, and starting address and ending address of each memory segment are presented in columns 902 and 903, respectively. In addition, used memory bytes, unused memory bytes and expanded memory bytes are shown in columns 904, 905 and 906, respectively. As shown in column 906, the memory segment DATA has been expanded 0x30b bytes, while memory segments PROG and DATA_A have not been expanded.

In one example, a minimum memory expansion size required for a memory segment to accommodate all input sections to be mapped to the memory segment is calculated according to the following expression, minimum memory expansion size=expanded memory bytes−unused memory bytes.

In FIG. 9 example, for memory segment DATA in line 4, using the numbers of unused memory bytes (0xc) in column 905 and expanded memory bytes (0x30b) in column 906 the minimum memory expansion size can be calculated as follows, 0x30b−0xc=ox2ff.

In order to solve OOM issue occurring at a memory segment, in one example, based on an LDF including memory expansion information, a developer can search in the memory segment for an output section that has a size larger that the required minimum memory expansion size, and move such an output section to another memory segment. For example, in FIG. 9 example, an output section in the memory segment DATA whose size is larger than 0x2ff can be selected to move to the memory segment DATA_A whose unused memory size 0x330 (as shown in line 5 column 905) is larger than 0x2ff. Consequently, the OOM issue occurring at the memory segment DATA can be solved.

Figure 10:
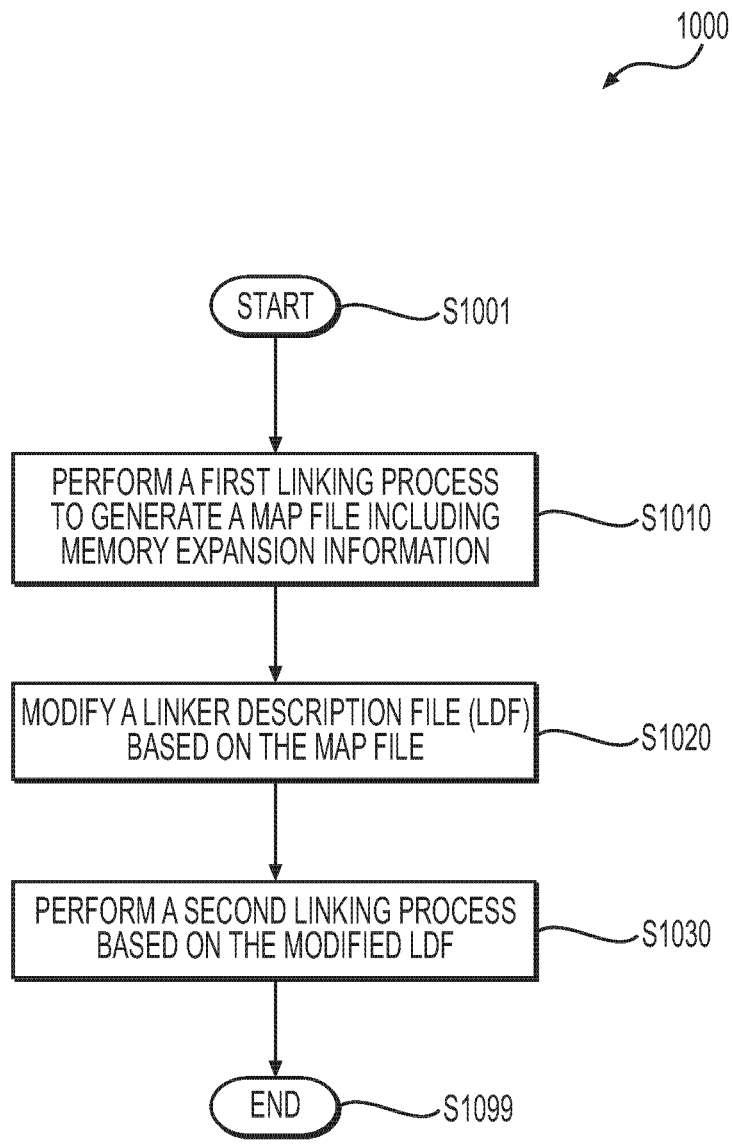
FIG. 10 shows a process for solving the OOM issue according to an embodiment of the disclosure.

FIG. 10 shows a process 1000 for solving the OOM issue according to an embodiment of the disclosure. The process 1000 starts at S1001 and proceeds to S1010.

At S1010, a first linking process is performed to generate a map file including memory expansion information. The first linking process is directed by an LDF. For example, the process 700 in FIG. 7 example can be first performed under direction of the LDF. When an OOM event occurs, the steps from S710 to S728 of the process 700 are performed and a map file can be obtained. As a result, memory expansion information of memory segments at which the OOM event occurs can be obtained. The memory expansion information may include expanded memory bytes of a memory segment as shown in the FIG. 9 example. The memory expansion information may also include used memory bytes and unused memory bytes of the respective memory segment that has been expanded to accommodate an input section.

At S1020, the LDF for directing the first linking process is modified based on the map file obtained at S1010. For example, as described in the FIG. 9 example, when a memory segment is expanded to accommodate input sections as the result of S1010, a developer can modify the LDF to move an output section previously assigned to the memory segment to another memory segment based on memory expansion information in the obtained map file to solve the OOM issue. Specifically, the moved output section has a size larger than a minimum memory expansion size determined, for example, in a way as described in the FIG. 9 example.

At S1030, a second linking process is performed based on the modified LDF. For example, the process 700 is performed. Due to the modification of the LDF, no OOM event occurs, and the steps from S710 to S734 are performed. As a result, the linking process 700 is completed successfully. The process 1000 then proceeds to S1099, and terminates at S1099.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for linking input files, comprising:
    (a) receiving an input section that is to be mapped to a current memory segment by a linker circuit;
    (b) determining an out-of-memory (OOM) event occurs when an available memory space of the current memory segment is unable to accommodate the input section;
    (c) when an OOM event occurs, estimating a memory expansion size that would be required for the current memory segment to be able to accommodate the input section;
    (d) repeating (a), (b) and (c) for a plurality of input sections that are to be mapped to the current memory segment by the linker circuit; and
    (f) expanding the current memory segment by a size that is a sum of the estimated memory expansion sizes corresponding to respective input sections for which OOM events occur.

2. The method of claim 1, further comprising:
    repeating (a)-(f) with the expanded current memory segment obtained at (f) as a current memory segment until no OOM event occurs; and
    creating by the linker circuit a map file that includes a sum of each memory expansion size estimated at each repetition of (c).

3. The method of claim 2, further comprising:
    performing a linking process for linking the input files based on a linker description file (LDF) that is modified based on the created map file.

4. The method of claim 3, wherein in the modified LDF, an output section in the current memory segment is moved to another memory segment, the moved output section having a size larger than a difference between the sum of each memory expansion size estimated at each repetition of (c) and a size of an unused memory in the current memory segment.

5. The method of claim 1, wherein estimating a memory expansion size that would be required for the current memory segment to be able to accommodate the input section includes:
    determining a difference between a size of the input section and a size of the available memory space in the current memory segment to be the memory expansion size that would be required for the current memory segment to be able to accommodate the input section.

6. An apparatus for linking input files, comprising processing circuitry configured to,
    (a) receive an input section that is to be mapped to a current memory segment;
    (b) determine an out-of-memory (OOM) event occurs when an available memory space of the current memory segment is unable to accommodate the input section;
    (c) when an OOM event occurs, estimate a memory expansion size that would be required for the current memory segment to be able to accommodate the input section;
    (d) repeat (a), (b) and (c) for a plurality of input sections that are to be mapped to the current memory segment; and (f) expand the current memory segment by a size that is a sum of the estimated memory expansion sizes corresponding to respective input sections for which OOM events occur.

7. The apparatus of claim 6, wherein the processing circuitry is further configured to,
repeat (a)-(f) with the expanded current memory segment obtained at (f) as a current memory segment until no OOM event occurs; and
create a map file that includes a sum of each memory expansion size estimated at each repetition of (c).

8. The apparatus of claim 7, wherein the processing circuitry is further configured to,
perform a linking process for linking the input files based on a linker description file (LDF) that is modified based on the created map file.

9. The apparatus of claim 8, wherein in the modified LDF, an output section in the current memory segment is moved to another memory segment, the moved output section having a size larger than a difference between the sum of each memory expansion size estimated at each repetition of (c) and a size of an unused memory in the current memory segment.

10. The apparatus of claim 6, wherein the processing circuitry is further configured to,
determine a difference between a size of the input section and a size of the available memory space in the current memory segment to be the memory expansion size that would be required for the current memory segment to be able to accommodate the input section.

11. A non-transitory computer readable medium storing program instructions for causing a processor to perform operations for linking input files, the operations comprising:
(a) receiving an input section that is to be mapped to a current memory segment;
(b) determining an out-of-memory (OOM) event occurs when an available memory space of the current memory segment is unable to accommodate the input section;
(c) when an OOM event occurs, estimating a memory expansion size that would be required for the current memory segment to be able to accommodate the input section;
(d) repeating (a), (b) and (c) for a plurality of input sections that are to be mapped to the current memory segment; and
(f) expanding the current memory segment by a size that is a sum of the estimated memory expansion sizes corresponding to respective input sections for which OOM events occur.

12. The non-transitory computer readable medium of claim 11, wherein the operations further comprising:
repeating (a)-(f) with the expanded current memory segment obtained at (f) as a current memory segment until no OOM event occurs; and
creating a map file that includes a sum of each memory expansion size estimated at each repetition of (c).

13. The non-transitory computer readable medium of claim 12, wherein the operations further comprising:
performing a linking process for linking the input files based on a linker description file (LDF) that is modified based on the created map file.

14. The non-transitory computer readable medium of claim 11, wherein the operations further comprising:
determining a difference between a size of the input section and a size of the available memory space in the current memory segment to be the memory expansion size that would be required for the current memory segment to be able to accommodate the input section.

\* \* \* \* \*